US011651024B2

(12) United States Patent
Glatfelter et al.

(10) Patent No.: US 11,651,024 B2
(45) Date of Patent: May 16, 2023

(54) AUTOMATED PART-INFORMATION GATHERING AND TRACKING

(71) Applicant: THE BOEING COMPANY, Chicago, IL (US)

(72) Inventors: John W. Glatfelter, Kennett Square, PA (US); Oscar Kipersztok, Redmond, WA (US); Mahyar Rahbarrad, Edmonds, WA (US)

(73) Assignee: THE BOEING COMPANY, Arlington, VA (US)

( * ) Notice: Subject to any disclaimer, the term of this patent is extended or adjusted under 35 U.S.C. 154(b) by 279 days.

(21) Appl. No.: 15/930,930

(22) Filed: May 13, 2020

(65) Prior Publication Data

US 2021/0357685 A1    Nov. 18, 2021

(51) Int. Cl.
| | | |
|---|---|---|
| *G06T 7/70* | (2017.01) | |
| *G06F 16/532* | (2019.01) | |
| *G06F 16/587* | (2019.01) | |
| *G06N 20/00* | (2019.01) | |
| *G06V 30/413* | (2022.01) | |
| *G06K 9/62* | (2022.01) | |

(52) U.S. Cl.
CPC ......... *G06K 9/6256* (2013.01); *G06F 16/532* (2019.01); *G06F 16/587* (2019.01); *G06K 9/6267* (2013.01); *G06N 20/00* (2019.01); *G06T 7/70* (2017.01); *G06V 30/413* (2022.01); *G06T 2207/20081* (2013.01)

(58) Field of Classification Search
CPC ..... G06F 16/532; G06F 16/587; G06N 20/00; G06V 20/10; G06V 30/413; G06V 2201/10; G06V 2201/06; G06K 9/6256; G06K 9/6293; G06K 9/6267; G06T 7/70; G06T 2207/20081; G06Q 10/087
See application file for complete search history.

(56) References Cited

U.S. PATENT DOCUMENTS

| | | | |
|---|---|---|---|
| 7,899,823 B1 * | 3/2011 | Trandal | G06Q 10/087 |
| | | | 707/736 |
| 2016/0217157 A1 * | 7/2016 | Shih | G06F 16/5854 |
| 2019/0057435 A1 * | 2/2019 | Chomley | G06V 30/194 |
| 2019/0147103 A1 * | 5/2019 | Bhowan | G06N 5/022 |
| | | | 707/737 |

(Continued)

*Primary Examiner* — Vu Le
*Assistant Examiner* — Tracy Mangialaschi
(74) *Attorney, Agent, or Firm* — Alleman Hall Creasman & Tuttle LLP (57) ABSTRACT

A method for identifying a component part includes receiving a digital image of an object and textual information about the object and accessing images of component parts and textual information about the component parts. The method further includes applying the digital image to a first classifier trained on the images of the component parts to classify the object as a first of the component parts and applying the textual information about the object to a second classifier trained on the textual information about the component parts to recognize the textual information as information about the first of the component parts or a second of the component parts. The method further includes identifying the object as a component part that is the first of the component parts or the second of the component parts and accessing a data record with information about the component part.

21 Claims, 4 Drawing Sheets

(56) References Cited

U.S. PATENT DOCUMENTS

2019/0340567 A1* 11/2019 Long .................... G06F 1/1686
2020/0034782 A1* 1/2020 Hsieh ................. G06Q 30/0627
2021/0312205 A1* 10/2021 Meidar ................ G06V 30/194

* cited by examiner

AUTOMATED PART-INFORMATION GATHERING AND TRACKING

TECHNOLOGICAL FIELD

The subject disclosure relates generally to object recognition and, in particular, to the use of image-based and text-based machine learning models to identify an object as a component part and locate the object within a heterogeneous inventory.

BACKGROUND

Many modern manufacturing operations rely on complex and sophisticated supply chains. Such supply chains often involve multiple sources of raw materials, subassemblies, tools, consumables, and other component parts that are intended to be received at their intended destination within relatively short time windows during which the components parts are to be combined, applied, or otherwise used. Particularly in situations involving the manufacture of products that involve multiple component parts that must be assembled in a given sequence, delays in the delivery of the needed component parts can cause undesirable disruptions.

One source of delay in the delivery of component parts arises from the technical challenges associated with maintaining complex inventories at one or more warehouses. Some such technical challenges include those involved with the accurate documentation of the receipt of multiple disparate component parts, the identification of the storage location of such component parts within a warehouse or other physical space, and the confirmation that a component part selected from inventory correctly fulfills a received request. These and other technical challenges are often compounded with the complexity and sophistication of the manufactured product and the component parts therein, the use of technical jargon, informal language, incongruent nomenclatures, or different languages to refer to the same component parts.

BRIEF SUMMARY

Example implementations of the subject disclosure are directed object recognition, particularly the use of image-based and text-based machine learning models to identify an object as a component part and locate the object within a heterogeneous inventory.

The technical challenges associated with maintaining complex inventories at one or more warehouses are often among the sources of significant delays and disruptions in modern manufacturing operations (e.g., aircraft manufacturing and/or assembly) and the supply chains used to support such operations. In some situations, thousands of different component parts, such as raw materials, subassemblies, tools, consumables, and the like, may be received by, stored, retrieved, and/or removed from the inventory of a warehouse within a short time frame. As such, it is often difficult to maintain accurate records documenting the receipt of a particular component part, the physical location within a warehouse at which the component part is stored, and whether the component part in inventory meets the requirements of a request for a given component part. These technical challenges are often compounded in situations where it is unclear if a given object received at a warehouse or already stored in inventory is a particular component. These and other technical challenges can be further compounded in situations where a given object or component part is identified through the use of technical jargon, informal language, incongruent nomenclatures, or different languages.

To address these and other technical challenges, example implementations of the subject disclosure involve the use of an automated system to identify an object as a particular component part, and access an appropriate data record associated with the component part. Example implementations of the subject disclosure apply one or more captured images to a first classifier that has been trained on images of the component parts and apply received textual information to a second classifier that has been trained on textual information about the component parts. Upon identification of a given object as a particular component part, the accessed data record can be identified, updated, or otherwise provided to a user.

The subject disclosure thus includes, without limitation, the following example implementations.

Some example implementations provide a method for identifying a component part, the method comprising: receiving a digital image of an object and textual information about the object; accessing images of component parts and textual information about the component parts; applying the digital image to a first classifier trained on the images of the component parts to classify the object as a first of the component parts; applying the textual information about the object to a second classifier trained on the textual information about the component parts to recognize the textual information as information about the first of the component parts or a second of the component parts; identifying the object as a component part that is the first of the component parts or the second of the component parts; and accessing a data record with information about the component part.

In some example implementations of the method of any preceding example implementation, or any combination of any preceding example implementations, the digital image of the object and the textual information about the object are received in an update query that also includes information indicating the location of the object, and the method further comprises, in response to the update query, updating the data record to further include the digital image of the object, the textual information about the object, and the information indicating the location of the object.

In some example implementations of the method of any preceding example implementation, or any combination of any preceding example implementations, the digital image of the object and the textual information about the object are received in a select query, and the information about the component part includes information indicating a location of the component part, and the method further comprises, in response to the select query, retrieving the information indicating the location of the component part from the data record.

In some example implementations of the method of any preceding example implementation, or any combination of any preceding example implementations, the select query is received from a mobile device, and the method further comprises causing display of the information indicating the location of the component part in a graphical user interface (GUI) of the mobile device.

In some example implementations of the method of any preceding example implementation, or any combination of any preceding example implementations, accessing the images of the component parts comprises accessing images rendered from digital models of the component parts.

In some example implementations of the method of any preceding example implementation, or any combination of any preceding example implementations, the digital image of the object and the textual information about the object are received from a mobile device equipped with a digital camera that captured the digital image, and an input device that received user input of the textual information about the object.

In some example implementations of the method of any preceding example implementation, or any combination of any preceding example implementations, the mobile device is further configured to determine a location of the mobile device, and thereby a location of the object when the mobile device is located proximate the object, and the digital image of the object and the textual information about the object are received in an update query that also includes information indicating the location of the object.

In some example implementations of the method of any preceding example implementation, or any combination of any preceding example implementations, identifying the object as a component part that is the first of the component parts or the second of the component parts comprises receiving a first confidence factor from the first classifier; receiving a second confidence factor from the second classifier; accessing design information about the first of the component parts and the second of the component parts; and determining an identification of the object based on a location of the object, the first confidence factor, the second confidence factor, and the design information.

Some example implementations provide an apparatus for identifying a component part, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for identifying a component part, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the subject disclosure will be apparent from a reading of the following detailed description together with the accompanying figures, which are briefly described below. The subject disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURES

Having thus described example implementations of the disclosure in general terms, reference will now be made to the accompanying figures, which are not necessarily drawn to scale, and wherein:

DETAILED DESCRIPTION

Some implementations of the subject disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the subject disclosure are directed object recognition, particularly the use of image-based and text-based machine learning models to identify an object as a component part and locate the object within a heterogeneous inventory.

The technical challenges associated with maintaining complex inventories at one or more warehouses are often among the sources of significant delays and disruptions in modern manufacturing operations and the supply chains used to support such operations. In some situations, large numbers and quantities of different component parts, such as raw materials, subassemblies, tools, consumables, and the like, may be received by, stored, retrieved, and removed from the inventory of a warehouse within a short time frame. The size, complexity, and high turnover rate of an inventory often impedes the maintenance of accurate records documenting the receipt of a particular component part, the physical location within a warehouse at which the component part is stored, and/or whether the component part in inventory meets the requirements of a request for a given component part. These technical challenges are often compounded in situations where it is unclear if a given object received at a warehouse or already stored in inventory is a particular component part. These and other technical challenges can be further compounded in situations where a given object or component part is identified through the use of technical jargon, informal language, incongruent nomenclatures, or different languages.

To address these and other technical challenges, example implementations of the subject disclosure involve the use of an automated system to identify an object as a particular component part, and access an appropriate data record associated with the component part. Example implementations of the subject disclosure apply one or more captured images to a first classifier that has been trained on images of the component parts and apply received textual information to a second classifier that has been trained on textual information about the component parts. Upon identification of a given object as a particular component part, the accessed data record can be identified, updated, or otherwise provided to a user.

Example implementations of the subject disclosure leverage two, separate classifiers (which may be machine learning models that are trained on one or more data sets) to identify a given object as a particular component part. By incorporating both an image-based classifier and a text-based classifier, example implementations of the subject disclosure involve determining the identity of an object as a particular component part by separately processing a captured or otherwise supplied image of the object and user-supplied textual information about the object. As such, whether a particular user is tasked with identifying a received object and accurately capturing its storage location and identity as a component part, or whether that user is tasked with fulfilling a request for a particular component part that may be in inventory, example implementations of the subject disclosure address one or more technical challenges likely to be encountered by such a user.

Figure 1:
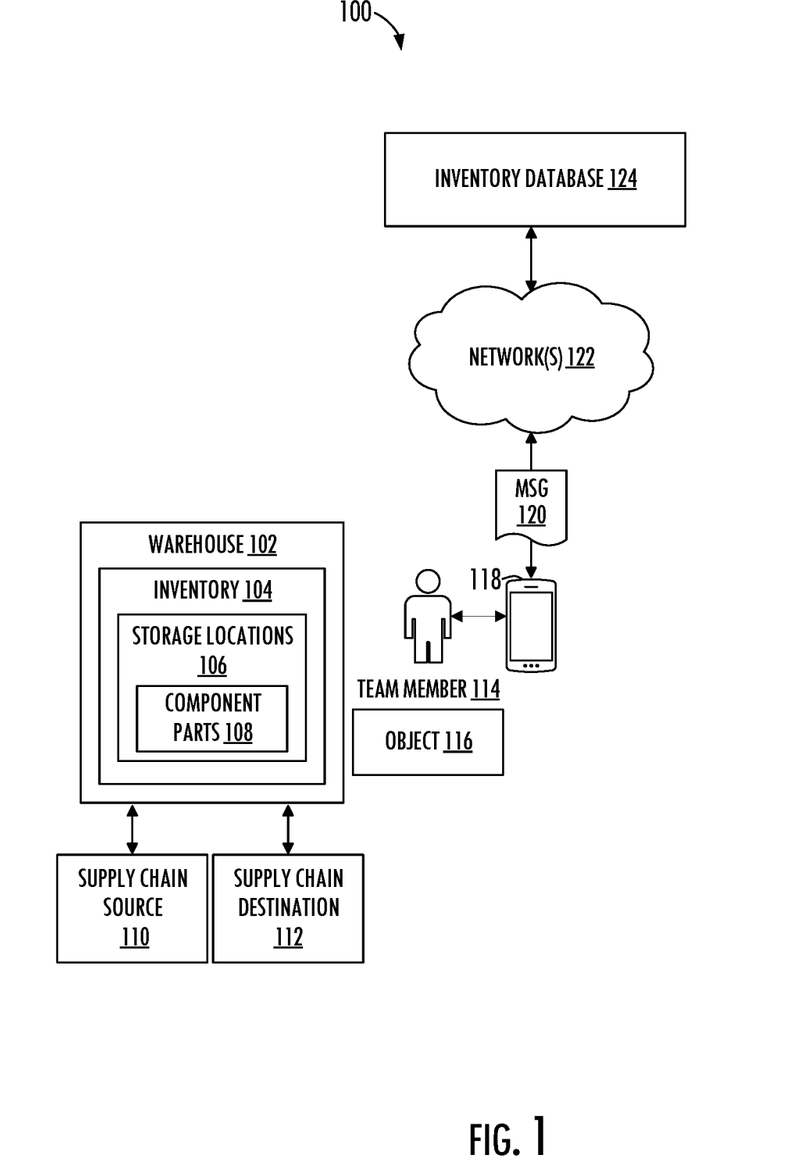
FIG. 1 illustrates a system environment in which example implementations of the subject disclosure can be deployed.

FIG. 1 illustrates a system environment 100 in which example implementations of the subject disclosure may be deployed. As shown in FIG. 1, the system environment includes a warehouse 102, which is a physical structure that houses an inventory 104, which includes multiple storage locations 106, such as shelves, bins, lockers, cabinets, other storage facilities, and the like, for example, that are configured to store one or more component parts 108. In some example situations, the inventory may be heterogeneous in the sense that the component parts include a wide variety of component parts with differing characteristics. In some instances, the differing characteristics may be readily apparent, while in other instances, the differences between component parts may be difficult for a person to rapidly discern. In some such instances, and in other instances, the inventory may also be extensive in the sense that many different component parts in varying quantities may be present within the warehouse.

As shown in FIG. 1, the warehouse 102 is configured to receive component parts from and return component parts to at least one supply chain source 110. For example, manufacturers, retailers, wholesalers, shipping companies, or other suppliers of component parts may be supply chain sources in example implementations of the system environment 100, and can cause components to be delivered to or otherwise received by the warehouse. The warehouse is also configured to send component parts to and receive component parts from at least one supply chain destination 112. For example, a supply chain destination can be a final destination, where the component part is integrated into another product, consumed, or otherwise used, or can be an intermediate destination, such as another warehouse.

As shown in FIG. 1, a team member 114 is a person or robotic device tasked with performing one or more operations associated with the warehouse 102 and the management of the inventory 104 therein. When an object 116 arrives at the warehouse, the team member 114 is tasked with identifying the object 116 as a particular component among component parts 108 and placing the object in a storage location 106. The team member 114 can also be tasked with responding to a request for a particular component part from the inventory 104, and can acquire an object believed to be the requested component part from its storage location within the inventory 104 of the warehouse 102, and then ship or otherwise provide the object to its supply chain destination.

In some example implementations, the team member 114 can interact with a computer 118 to interface via one or more computer networks 122 with an inventory data store 124. Upon receipt of an object 116, the team member 114 can use the computer to generate a message 120 identifying or otherwise describing the object 116 and its storage location 106 within the warehouse 102. When received by the inventory data store 124, the information in the message updates the relevant records in the inventory data store 124 with respect to the received object 116. In example implementations where the team member 114 is tasked with locating a requested component part from one or more component parts 108, the team member 114 can use the computer 118 to query the inventory data store 124 for the location of the requested component part and receive the location information in a message from the inventory data store 124.

In many situations, such as those involving an inventory 104 that is extensive, heterogeneous, or otherwise complex, it is unlikely that the team member 114 will have perfect knowledge of all of the component parts 108 within the inventory 104. As such, the information used by the team member 114 to document or otherwise describe an object 116 and its storage location 106 in the inventory 104 may not accurately or completely identify the object 116 as a particular component part. Consequently, the accuracy and quality of the information stored in the inventory data store 124 can vary significantly based on the expertise of the team member 114. The accuracy and quality of the information in the inventory data store 124 can also vary significantly based on the nomenclature, terminology, language, and documentation provided by a supply chain source 110 in connection with objects supplied to the warehouse 102. In situations where the team member 114 is tasked with retrieving one or more component parts 108 from the inventory 104 in response to requests from a supply chain destination 112, the likelihood that an object provided to the supply chain destination 112 is the requested component part can likewise vary significantly on the quality and accuracy of the information in the inventory data store 124, the expertise of the team member 114, and the nomenclature, terminology, language, and/or documentation provided by the requesting supply chain destination.

Figure 2:
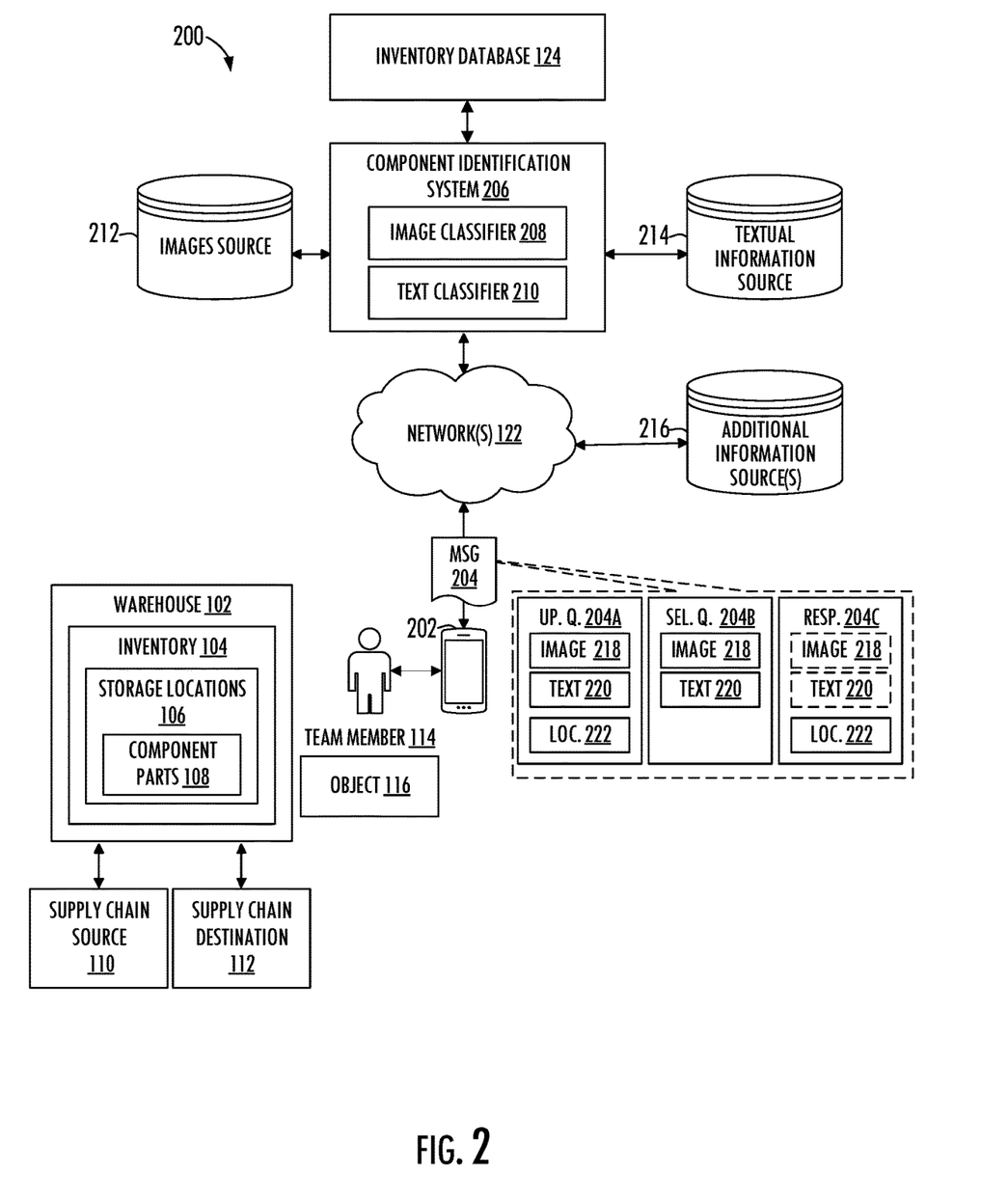
FIG. 2 illustrates a system environment in accordance with example implementations of the subject disclosure.

FIG. 2 illustrates a system 200 for identifying an object 116 as a component part among the component parts 108, according to example implementations of the subject disclosure. The system 200 can include any of a number of different subsystems (each an individual system) for performing one or more functions or operations. As shown, in some examples, the system includes a computer 202, a component identification system 206 (which includes or otherwise interacts with classifiers, such as an image classifier 208 and a text classifier 210), an images source 212, a textual information source 214, the inventory data store 124 and can also include one or more additional information sources 216. The subsystems including the computer 202, component identification system 206, image classifier 208, text classifier 210, images source 212, textual information source 214, and additional information source(s) 216 can be co-located or directly coupled to one another, or in some examples, various ones of the subsystems can communicate with one another across one or more computer networks 122. Further, although shown as part of the system 200, it should be understood that any one or more of the above can function or operate as a separate system without regard to any of the other subsystems. It should also be understood that the system can include one or more additional or alternative subsystems than those shown in FIG. 2.

As shown in FIG. 2, the system 200 can be deployed in situations that incorporate all or part of the system environment 100. In particular, the component identification system 206, in conjunction with the computer 202, is employed to overcome many of the technical challenges experienced by a team member 114 in the course of managing tasks associated with the warehouse 102, the storage locations 106 and component parts 108 in the inventory 104 of the warehouse 102, such as those involved with accurately identifying and/or documenting an object 116 as such objects are received from a supply chain source 110 and/or requested by a supply chain destination 112.

In some example implementations of the subject disclosure, a team member 114 selects an object 116. For example, the object may have been received from a supply chain source 110, and the team member 114 has been tasked with placing the object 116 in the inventory 104 of the warehouse 102. In accordance with example implementations of the subject disclosure, the team member 114 captures an image of the object 116, for example by using the computer 202 (such as a tablet, smartphone, or other mobile device, for example). In one aspect, in response to capture of the image and/or based on user input provided by the team member 114, computer 202 can generate a message 204 that includes a digital image 218 of the object 116 (or a portion of the object 116) and textual information 220 about the object 116, such as part numbers, names, textual descriptions, related jargon, and the like. In some examples, the message is an update query 204A, and in other examples, the message is a select query 204B. This message 204 is then transmitted by the computer 202 via the computer network(s) 122, where it is received by the component identification system 206.

Upon receipt of the message 204 that comprises the digital image 218 and textual information 220 about the object 116, the component identification system 206 accesses images of component parts 108 from the images source 212, and textual information about the component parts 108 from the textual information source 214. In some example implementations, the images of the component parts 108 stored in the images source 212 can include data store records and/or other files comprising computer-readable photographs, engineering drawings, images rendered from digital models, sketches, or the like depicting one or more component parts 108 or portions thereof. In some example implementations, the textual information source 214 can include data store records and/or other files containing computer-readable text associated with one or more component parts 108 or portions thereof. For example, the files in the textual information source 214 can include specifications documents, component part numbers, component part names, colloquial names for the component part, jargon used in connection with the component part, textual descriptions of the component part, or the like.

As shown in FIG. 2, the component identification system 206 includes a first classifier that is the image classifier 208, and a second classifier that is the text classifier 210. In example implementations of the subject disclosure, the image classifier 208 is trained on the images of the component parts 108 from the images source 212, and the text classifier 210 is trained on the textual information from the textual information source 214. The component identification system applies the digital image 218 received in message 204 to the image classifier 208 to classify the object 116 as a first component part of the component parts 108, and applies the textual information 220 about the object 116 received in the message 204 to the text classifier 210 to recognize the textual information 220 as information about the first component part of the component parts 108 (that is, the component part identified by the image classifier), or as information about a second component part of the component parts. Based on the results from the two classifiers, the component identification system 206 identifies the object 116 as one of the component parts 108 identified by the classifiers, and accesses a data record from the inventory data store 124 or one or more of the additional information sources 216 with information (e.g., location data) about the component part.

As discussed or otherwise disclosed herein, the team member 114 can be tasked with either or both entering received objects 116 into the inventory 104 of the warehouse 102, and selecting objects from the inventory 104 to satisfy requests for component parts 108. Some example implementations of the subject disclosure overcome technical challenges associated with both categories of tasks. For example, the message 204 can take the form of an update query 204A and further include location information 222 indicating the storage location 106 within the inventory 104 where the object 116 was placed. In response to receiving the update query 204A, the component identification system 206 updates the accessed data record within inventory data store 124 to include the digital image 218 of the object 116, the textual information 220 about the object 116, and the information 222 indicating the location of the object 116.

In example implementations that arise in situations where the team member 114 is tasked with selecting an object 116 to fulfill a request from a supply chain destination 112 or other requesting entity for a given component part among component parts 108, the digital image 218 of the object 116 and the textual information 220 about the object 116 can be sent to the component identification system 206 in message 204 in the form of a select query 204B. The component identification system 206 can identify (e.g., by utilizing image classifier 208 and text classifier 210) a component part corresponding to the object 116, access a data record associated with the component part within the inventory data store 124, respond to the select query with a response message 204C by retrieving, from the accessed data record, location information 222 indicating the storage location 106 of the component part in the inventory 104. In some example implementations, the response message 204C can also include either or both of the digital image 218 of the object 116 and the textual information 220 about the object 116.

In example implementations where the computer 202 is a mobile device, such as a tablet, smartphone, or the like, the functionality of the computer 202 can be leveraged to further improve the accuracy and efficiency of the identification and location of objects 116 and component parts 108. For example, in some such example implementations, the response message 204C to a select query 204B can further cause the location information 222 indicating a location of the component part to be displayed on a graphical user interface (GUI) of the mobile device. In example implementations where the computer 202 is a mobile device, the location of the mobile device can be determined when the mobile device is proximate to the storage location 106 of an object 116, and that location can be used in an update query 204A to indicate the location where the object 116 is stored.

It will be appreciated that in some example implementations, additional information can be accessed and used to identify an object 116 as a component part among component parts 108. For example, the image classifier 208 and/or the text classifier 210 can generate confidence factors in their respective identifications of the object 116 as a particular component part among the component parts 108, and these confidence factors can be used by the component identification system 206 when identifying a given object as one of the component parts identified by the classifiers. The component identification system 206 can also capture, access, and/or otherwise use other information in connection with identifying an object and/or updating a record associated with a component part. For example, the location of the object, additional design information about the relevant component parts, referential factory planning information, tooling information, and/or engineering data sources can all be accessed and used by the component identification system 206.

In some example implementations, information about the receipt, handling, and/or processing of an object 116 can be used in the identification of an object and/or in connection with accessing and updating a data record by the component identification system 206. For example, time and date information associated with the receipt and/or movement of an object, identification of the team member 114 who performed one or more tasks associated with the object, manufacturing scheduling information, comments regarding the condition or appearance of the object, and the like can be sent to the component identification system 206 from an additional data source 216 via the computer network(s) 122.

In example implementations where the image classifier 208 and/or the text classifier 210 are machine learning models configured to incorporate additional information in their respective training and learning, such additional information can be incorporated into the training data used by the classifiers. In some such example implementations, the classifiers can be able to incorporate image-based and text-based information about component parts 108 and other objects 116 that may not be readily discernible from more common information sources. For example, technical drawings and specification documentation may not include information depicting the packaging used by a supply chain source 110 in connection with providing a component part among component parts 108. In another example, the use of additional textual information derived from messages 204 sent to the component identification system 206 can allow the text classifier 210 to identify and incorporate jargon or other informal language used in connection with a given object or component part that may not be reflected in specification documents or other formal documentation.

Figure 3:
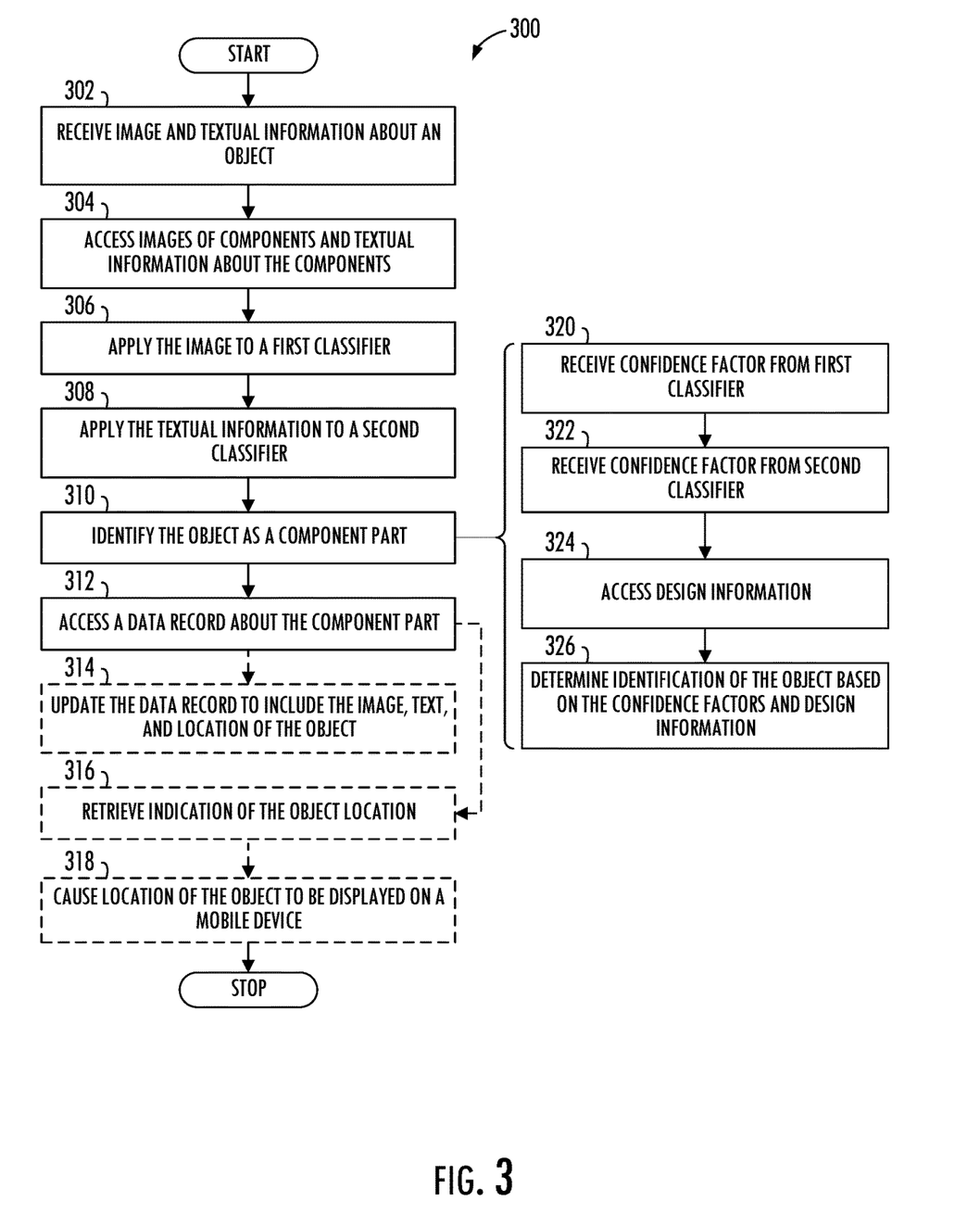
FIG. 3 is a flowchart illustrating various steps in a method for identifying a component part, according to example implementations.

FIG. 3 is a flowchart illustrating various steps in a method 300 for identifying a component part, according to example implementations of the subject disclosure. As shown at block 302, the method includes receiving a digital image (e.g., image 218) and textual information (e.g., textual information 220) about an object (e.g., object 116). Some example implementations of block 302 involve receiving a digital image of an object and textual information about the object. Any approach to receiving the digital image of the object and textual information about the object can be used in connection with example implementations of block 302. For example, a team member (e.g., team member 114) can use a device (e.g., computer 202) to capture an image of a received object and to supply textual information about the object. In another example, the team member can use a separate scanning device, which is coupled to the computer, to capture the image and/or to supply the textual information, which can then be transferred to the computer. The computer can incorporate that information into a message (e.g., message 204), such as an update query 204A or a select query 204B that is received by the component identification system 206. In some example implementations, the digital image of the object and the textual information about the object are received from a mobile device (such as when the computer is implemented as a tablet, smartphone, or the like, for example), equipped with a digital camera that captured the digital image, and an input device that received user input of the textual information about the object.

In some example implementations of block 302 where the computer is implemented as a mobile device, the mobile device is further configured to determine a location of the mobile device and thereby a storage location 106 of the object 116 when the mobile device determined to be located proximate to the object, and wherein the digital image of the object and the textual information about the object are received in an update query that also includes location information 222 indicating the location of the object. For example, the computer can transmit the update query with the image, text, and location information via an update query 204A to the component identification system 206.

As shown at block 304, the method 300 includes accessing images of components and textual information about the components. Some example implementations of block 304 involve accessing images of component parts and textual information about the component parts that are to be utilized as a training set for one or more classifiers. For example, images of component parts can be accessed from the images source 212 and textual information can be accessed from the textual information source 214 to train the classifiers 208 and 210. In some example implementations, additional images and/or textual information can be accessed from one or more additional information sources 216. In some example implementations, accessing the images of the component parts comprising accessing images rendered from digital models of the component parts.

As shown at block 306, the method 300 also includes applying the digital image 218 to a first classifier. Some example implementations of block 306 involve applying the digital image to a first classifier trained on the images of the component parts to classify the object as a first of the component parts. For example, the digital image received from message 204 can be applied to the image classifier 208, which has been trained at least in part on the images of component parts from the images source 212.

As shown at block 308, the method 300 also includes applying the textual information 220 to a second classifier. Some example implementations of block 308 involve applying the textual information about the object to a second classifier trained on the textual information about the component parts to recognize the textual information as information about the first of the component parts or a second of the component parts. For example, the textual information received via message 204 can be applied to the text classifier 210, which has been trained at least in part on the textual information about component parts in the textual information source 214.

As shown at block 310, the method 300 also includes identifying the object 116 as a component part among the component parts 108. Some example implementations of block 310 involve identifying the object as a component part that is the first of the component parts or the second of the component parts. For example, the identifications provided by the image classifier 208 and the text classifier 210 can be utilized to determine which component part the object is most likely to be.

As shown in FIG. 3, some example implementations of block 310 can involve a number of additional blocks, depending on the configuration of the classifiers 208, 210 and the component identification system 206. As shown in block 320, identifying the object 116 as a particular component part among component parts 108 can include receiving a confidence factor from the first classifier. Some example implementations of block 320 involve receiving a first confidence factor from the first classifier. For example, the image classifier 208 can provide a confidence factor with its classification of the object as a particular component part, and this confidence factor can be received (e.g., by the component identification system 206) and used when determining the identity of the object as a particular component part.

As shown in block 322, identifying the object 116 as a particular component part among component parts 108 can include receiving a confidence factor from the second classifier. Some example implementations of block 322 involve receiving a second confidence factor from the second classifier. For example, the text classifier 210 can provide a confidence factor with its classification of the object as a particular component part, and this confidence factor can be received (e.g., by the component identification system 206) and used when determining the identity of the object as a particular component part.

As shown at block 324, identifying the object 116 as a particular component part among component parts 108 can include accessing design information. Some example implementations of block 324 involve accessing design information about the first of the component parts and the second of the component parts. For example, the component identification system 206 can access additional design information not otherwise reflected in the images source 212 or the textual information source 214 from one or more additional information sources 216. For example, such additional design information can include information about the storage, handling, sourcing, intended use, shipping, or other aspects of a component part that are not readily discernible in a given textual information source 214 or a given images source 212.

As shown at block 326, identifying the object 116 as a particular component part among component parts 108 can include determining the identification of the object based on the confidence factors and the design information. Some example implementations of block 326 involve determining an identification of the object based on a storage location 106 of the object, the first confidence factor, the second confidence factor, and the design information.

As shown at block 312, the method 300 includes accessing a data record about the determined component part. Some example implementations of block 312 involve accessing a data record with information about the component part. For example, upon identifying the object 116 as a particular component part among component parts 108, a data record stored either in the inventory data store 124 or in an additional information source 216 that contains information about the relevant component part can be accessed (e.g., by the component identification system 206).

As shown in FIG. 3, the method 300 can include one or more additional blocks depending on the situation in which a given example implementation arises. For example, the method 300 can include block 314, which includes updating the data record to include the digital image 218, textual information 220 and/or location information 222 of the object. Some example implementations of block 314 arise in situations where the digital image of the object 116 and the textual information about the object are received in an update query 204A that also includes location information indicating the location of the object, and in response to the update query, updating the data record to further include the digital image of the object, the textual information about the object, and the information indicating the location of the object. For example, the update query can include location information in addition to image and textual information, all of which can be incorporated by the component identification system 206 into the relevant data record.

As shown at block 316, the method 300 can include retrieving an indication of the object location. Some example implementations of block 316 arise where the digital image 218 of the object 116 and the textual information 220 about the object are received (e.g., by the component identification system 206) in a select query 204B, and the information about the component part includes information indicating the storage location 106 of the component parts 108 and involves, in response to the select query, retrieving the location information 222 indicating the location of the component part from the data record and transmitting that information in a response message 204C to the computer 202.

As shown in block 318, the method 300 can also include causing the location information 222 of the object 116 to be displayed on a user device (e.g., mobile device). Some example implementations of block 318 arise in situations where the select query 204B in block 316 is received from a mobile device (such as when computer 202 is implemented as a tablet, smartphone, or other mobile device, for example) and further involves causing display of the location information 222 indicating the location of the component parts 108 via a graphical user interface (GUI) of the mobile device.

According to example implementations of the subject disclosure, the system environments 100-200 and its subsystems including the computer 202, component identification system 206, image classifier 208, the text classifier 210, image source 212, textual information source 214, and the additional information source(s) 216 can be implemented by various means. Means for implementing the system and its subsystems can include hardware, alone or under direction of one or more computer programs from a computer-readable storage medium. In some examples, one or more apparatuses can be configured to function as or otherwise implement the system and its subsystems shown and described herein. In examples involving more than one apparatus, the respective apparatuses can be connected to or otherwise in communication with one another in a number of different manners, such as directly or indirectly via a wired or wireless network or the like.

Figure 4:
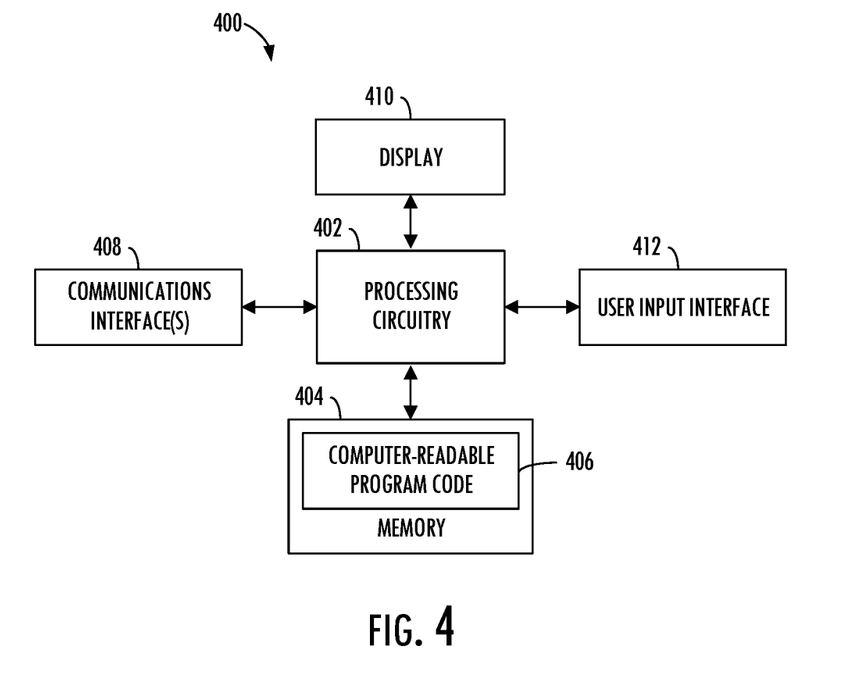
FIG. 4 illustrates an apparatus according to some example implementations.

FIG. 4 illustrates an apparatus 400 according to some example implementations of the subject disclosure. Generally, an apparatus of exemplary implementations of the subject disclosure can comprise, include or be embodied in one or more fixed or portable electronic devices. Examples of suitable electronic devices include a smartphone, tablet computer, laptop computer, desktop computer, workstation computer, server computer or the like. The apparatus (e.g., inventory data base 124, network(s) 122, computer 202, component identification system 206, image classifier 208, the text classifier 210, image source 212, textual information source 214, and the additional information source(s) 216, etc.) can include one or more of each of a number of components such as, for example, processing circuitry 402 (e.g., processor unit) connected to a memory 404 (e.g., storage device).

The processing circuitry 402 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 404 (of the same or another apparatus).

The processing circuitry 402 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the subject disclosure.

The memory 404 is generally any piece of computer hardware that is capable of storing information such as, for example, data, computer programs (e.g., computer-readable program code 406) and/or other suitable information on either a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk—read only memory (CD-ROM), compact disk—read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 404, the processing circuitry 402 can also be connected to one or more interfaces for displaying, transmitting and/or receiving information. The interfaces can include a communications interface 408 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 410 and/or one or more user input interfaces 412 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 can include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, can be implemented by special purpose hardware-based computer systems and/or processing circuitry which perform the specified functions, or combinations of special purpose hardware and program code instructions.

Further, the disclosure comprises embodiments according to the following clauses:

Clause 1: A method comprising receiving a digital image of an object and textual information about the object; applying the digital image to a first classifier that has been trained on source images of component parts in an inventory, to classify the object as a first component part of the component parts; applying the textual information about the object to a second classifier, that has been trained on source textual information about the component parts, to recognize the textual information as being information about the first component part of the component parts or a second component part of the component parts; identifying the object as a component part that is the first component part or the second component part; and accessing a data record associated with the component part.

Clause 2: The method of Clause 1, wherein the digital image of the object and the textual information about the object are received in an update query that also comprises location information indicating a location of the object, and wherein the method further comprises, in response to receiving the update query, updating the data record to further comprise the digital image of the object, the textual information about the object, and the location information indicating the location of the object.

Clause 3: The method of any of Clauses 1-2, wherein the digital image of the object and the textual information about the object are received in a select query, and the data record associated with the component part comprises location information indicating a location of the component part, and wherein the method further comprises, in response to receiving the select query, retrieving the location information indicating the location of the component part from the data record.

Clause 4: The method of any of Clauses 1-3, wherein the select query is received from a mobile device, and the method further comprises causing display of the location information indicating the location of the component part via a graphical user interface (GUI) of the mobile device.

Clause 5: The method of any of Clauses 1-4, further comprising accessing the source images of component parts and the source textual information about the component parts, wherein the accessing comprises accessing the source images that have been rendered from digital models of the component parts.

Clause 6: The method of any of Clauses 1-5, wherein the digital image of the object and the textual information about the object are received from a mobile device equipped with a digital camera that captured the digital image, and an input device that received user input of the textual information about the object.

Clause 7: The method of any of Clauses 1-6, wherein the mobile device is further configured to determine a location of the mobile device, and thereby a location of the object when the mobile device is determined to be located within a defined distance from the object, and wherein the digital image of the object and the textual information about the object are received in an update query that also comprises location information indicating the location of the object.

Clause 8: The method of any of Clauses 1-7, wherein identifying the object as the component part that is the first component part or the second component part comprises receiving a first confidence factor from the first classifier; receiving a second confidence factor from the second classifier; accessing design information about the first component part and the second component part; and determining an identification of the object based on a location of the object, the first confidence factor, the second confidence factor, and the design information.

Clause 9: An apparatus comprising a memory configured to store computer-readable program code; and processing circuitry configured to access the memory, and execute the computer-readable program code to cause the apparatus to at least receive a digital image of an object and textual information about the object; apply the digital image to a first classifier trained on source images of component parts in an inventory to classify the object as a first component part of the component parts; apply the textual information about the object to a second classifier, that has been trained on source textual information about the component parts to recognize the textual information as being information about the first component part of the component parts or a second component part of the component parts; identify the object as a component part that is the first of the component parts or the second of the component parts; and access a data record with information about the component part.

Clause 10: The apparatus of Clause 9, wherein the digital image of the object and the textual information about the object are received in an update query that also comprises information indicating a location of the object, and wherein the processing circuitry is configured to execute the computer-readable program code to cause the apparatus to further at least, in response to receiving the update query, update the data record to further comprise the digital image of the object, the textual information about the object, and the location information indicating the location of the object.

Clause 11: The apparatus of any of Clauses 9-10, wherein the digital image of the object and the textual information about the object are received in a select query, and the data record associated with the component part comprises location information indicating a location of the component part, and wherein the processing circuitry is configured to execute the computer-readable program code to cause the apparatus to further at least, in response to receiving the select query, retrieve the location information indicating the location of the component part from the data record.

Clause 12: The apparatus of any of Clauses 9-11, wherein the select query is received from a mobile device, and the processing circuitry is configured to execute the computer-readable program code to cause the apparatus to further at least cause display of the location information indicating the location of the component part via a graphical user interface (GUI) of the mobile device.

Clause 13: The apparatus of any of Clauses 9-12, wherein the processing circuitry is configured to execute the computer-readable program code to cause the apparatus to further at least access the source images of component parts and the source textual information about the component parts; wherein the apparatus being caused to access comprises the apparatus being caused to access the source images that have been rendered from digital models of the component parts.

Clause 14: The apparatus of any of Clauses 9-13, wherein the digital image of the object and the textual information about the object are received from a mobile device equipped with a digital camera that captured the digital image, and an input device that received user input of the textual information about the object.

Clause 15: The apparatus of any of Clauses 9-14, wherein the mobile device is further configured to determine a location of the mobile device, and thereby a location of the object when the mobile device is determined to be located within a defined distance from the object, and wherein the digital image of the object and the textual information about the object are received in an update query that also comprises location information indicating the location of the object.

Clause 16: The apparatus of any of Clauses 9-15, wherein the apparatus being caused to identify the object as a component part that is the first component part or the second component part comprises the apparatus being caused to: receive a first confidence factor from the first classifier; receive a second confidence factor from the second classifier; access design information about the first component part and the second component part; and determine an identification of the object based on a location of the object, the first confidence factor, the second confidence factor, and the design information.

Clause 17: A computer-readable storage medium, the computer-readable storage medium being non-transitory and having computer-readable program code stored therein that, in response to execution by processing circuitry, causes an apparatus to at least: receive a digital image of an object and textual information about the object; apply the digital image to a first classifier that has been trained on source images of component parts in an inventory, to classify the object as a first component part of the component parts; apply the textual information about the object to a second classifier that has been trained on source textual information about the component parts, to recognize the textual information as being information about the first component part of the component parts or a second component part of the component parts; identify the object as a component part that is the first component part or the second component part; and access a data record associated with the component part.

Clause 18: The computer-readable storage medium of Clause 17, wherein the digital image of the object and the textual information about the object are received in an update query that also comprises location information indicating a location of the object, and wherein the computer-readable storage medium has further computer-readable program code stored therein that, in response to execution by the processing circuitry, causes the apparatus to further at least, in response to receiving the update query, update the data record to further comprise the digital image of the object, the textual information about the object, and the location information indicating the location of the object.

Clause 19: The computer-readable storage medium of any of Clauses 17-18, wherein the digital image of the object and the textual information about the object are received in a select query, and the data record associated with the component part comprises location information indicating a location of the component part, and wherein the computer-readable storage medium has further computer-readable program code stored therein that, in response to execution by the processing circuitry, causes the apparatus to further at least, in response to receiving the select query, retrieve the location information indicating the location of the component part from the data record.

Clause 20: The computer-readable storage medium of any of Clauses 17-19, wherein the select query is received from a mobile device, and the computer-readable storage medium has further computer-readable program code stored therein that, in response to execution by the processing circuitry, causes the apparatus to further at least cause display of the information indicating the location of the component part via a graphical user interface (GUI) of the mobile device.

Clause 21: The computer-readable storage medium of any of Clauses 17-20, wherein the computer-readable storage medium has further computer-readable program code stored therein that, in response to execution by the processing circuitry, causes the apparatus to further at least access the source images of component parts and the source textual information about the component parts, wherein the apparatus being caused to access comprises the apparatus being caused to access the source images that have been rendered from digital models of the component parts.

Clause 22: The computer-readable storage medium of any of Clauses 17-21, wherein the digital image of the object and the textual information about the object are received from a mobile device equipped with a digital camera that captured the digital image, and an input device that received user input of the textual information about the object.

Clause 23: The computer-readable storage medium of any of Clauses 17-22, wherein the mobile device is further configured to determine a location of the mobile device, and thereby a location of the object when the mobile device is determined to be located within a defined distance from the object, and wherein the digital image of the object and the textual information about the object are received in an update query that also comprises location information indicating the location of the object.

Clause 24: The computer-readable storage medium of any of Clauses 17-23, wherein the apparatus being caused to identify the object as a component part that is the first component part or the second component part comprises the apparatus being caused to: receive a first confidence factor from the first classifier; receive a second confidence factor from the second classifier; access design information about the first component part and the second component part; and determine an identification of the object based on a location of the object, the first confidence factor, the second confidence factor, and the design information.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. To the extent that terms "includes," "including," "has," "contains," and variants thereof are used herein, such terms are intended to be inclusive in a manner similar to the term "comprises" as an open transition word without precluding any additional or other elements.

What is claimed is:

1. A method comprising:
receiving a digital image of an object from an image source and receiving textual information about the object from a textual information source that is separate from the image source;
applying the digital image to a first classifier that has been trained on source images of component parts in an inventory, to classify the object as a first component part of the component parts;
applying the textual information about the object to a second classifier, that has been trained on source textual information about the component parts, to recognize the textual information as being information about the first component part of the component parts or a second component part of the component parts;
identifying the object as a component part that is the first component part or the second component part, wherein identifying the object as the component part that is the first component part or the second component part comprises:
receiving a first confidence factor from the first classifier,
receiving a second confidence factor from the second classifier;
accessing design information about the first component part and the second component part, and
determining an identification of the object based on a location of the object, the first confidence factor, the second confidence factor, and the design information; and
accessing a data record associated with the component part.

2. The method of claim 1, wherein the digital image of the object and the textual information about the object are received in an update query that also comprises location information indicating a location of the object, and
wherein the method further comprises, in response to receiving the update query, updating the data record to further comprise the digital image of the object, the textual information about the object, and the location information indicating the location of the object.

3. The method of claim 1, wherein the digital image of the object and the textual information about the object are received in a select query, and the data record associated with the component part comprises location information indicating a location of the component part, and
wherein the method further comprises, in response to receiving the select query, retrieving the location information indicating the location of the component part from the data record.

4. The method of claim 3, wherein the select query is received from a mobile device, and the method further comprises causing display of the location information indicating the location of the component part via a graphical user interface (GUI) of the mobile device.

5. The method of claim 1, further comprising:
accessing the source images of component parts and the source textual information about the component parts, wherein the accessing comprises accessing the source images that have been rendered from digital models of the component parts.

6. The method of claim 1, wherein the digital image of the object and the textual information about the object are received from a mobile device equipped with a digital camera that captured the digital image, and an input device that received user input of the textual information about the object.

7. The method of claim 6, wherein the mobile device is further configured to determine a location of the mobile device, and thereby a location of the object when the mobile device is determined to be located within a defined distance from the object, and
wherein the digital image of the object and the textual information about the object are received in an update query that also comprises location information indicating the location of the object.

8. An apparatus comprising:
a memory configured to store computer-readable program code; and
processing circuitry configured to access the memory, and execute the computer-readable program code to cause the apparatus to at least:
receive a digital image of an object from an image source and receive textual information about the object from a textual information source that is separate from the image source;
apply the digital image to a first classifier trained on source images of component parts in an inventory to classify the object as a first component part of the component parts;
apply the textual information about the object to a second classifier, that has been trained on source textual information about the component parts to recognize the textual information as being information about the first component part of the component parts or a second component part of the component parts;
identify the object as a component part that is the first of the component parts or the second of the component parts, wherein the apparatus being caused to identify the object as a component part that is the first component part or the second component part comprises the apparatus being caused to:
receive a first confidence factor from the first classifier;
receive a second confidence factor from the second classifier;
access design information about the first component part and the second component part; and
determine an identification of the object based on a location of the object, the first confidence factor, the second confidence factor, and the design information; and
access a data record with information about the component part.

9. The apparatus of claim 8, wherein the digital image of the object and the textual information about the object are received in an update query that also comprises information indicating a location of the object, and
wherein the processing circuitry is configured to execute the computer-readable program code to cause the apparatus to further at least, in response to receiving the update query, update the data record to further comprise the digital image of the object, the textual information about the object, and the location information indicating the location of the object.

10. The apparatus of claim 8, wherein the digital image of the object and the textual information about the object are received in a select query, and the data record associated with the component part comprises location information indicating a location of the component part, and
wherein the processing circuitry is configured to execute the computer-readable program code to cause the apparatus to further at least, in response to receiving the select query, retrieve the location information indicating the location of the component part from the data record.

11. The apparatus of claim 10, wherein the select query is received from a mobile device, and the processing circuitry is configured to execute the computer-readable program code to cause the apparatus to further at least cause display of the location information indicating the location of the component part via a graphical user interface (GUI) of the mobile device.

12. The apparatus of claim 8, wherein the processing circuitry is configured to execute the computer-readable program code to cause the apparatus to further at least access the source images of component parts and the source textual information about the component parts;
wherein the apparatus being caused to access comprises the apparatus being caused to access the source images that have been rendered from digital models of the component parts.

13. The apparatus of claim 8, wherein the digital image of the object and the textual information about the object are received from a mobile device equipped with a digital camera that captured the digital image, and an input device that received user input of the textual information about the object.

14. The apparatus of claim 13, wherein the mobile device is further configured to determine a location of the mobile device, and thereby a location of the object when the mobile device is determined to be located within a defined distance from the object, and
wherein the digital image of the object and the textual information about the object are received in an update query that also comprises location information indicating the location of the object.

15. A computer-readable storage medium, the computer-readable storage medium being non-transitory and having computer-readable program code stored therein that, in response to execution by processing circuitry, causes an apparatus to at least:
receive a digital image of an object from an image source and receive textual information about the object from a textual information source that is separate from the image source;
apply the digital image to a first classifier that has been trained on source images of component parts in an inventory, to classify the object as a first component part of the component parts;
apply the textual information about the object to a second classifier that has been trained on source textual information about the component parts, to recognize the textual information as being information about the first component part of the component parts or a second component part of the component parts;
identify the object as a component part that is the first component part or the second component part, wherein the apparatus being caused to identify the object as a component part that is the first component part or the second component part comprises the apparatus being caused to:
receive a first confidence factor from the first classifier;
receive a second confidence factor from the second classifier;
access design information about the first component part and the second component part; and
determine an identification of the object based on a location of the object, the first confidence factor, the second confidence factor, and the design information; and
access a data record associated with the component part.

16. The computer-readable storage medium of claim 15, wherein the digital image of the object and the textual information about the object are received in an update query that also comprises location information indicating a location of the object, and
wherein the computer-readable storage medium has further computer-readable program code stored therein that, in response to execution by the processing circuitry, causes the apparatus to further at least, in response to receiving the update query, update the data record to further comprise the digital image of the object, the textual information about the object, and the location information indicating the location of the object.

17. The computer-readable storage medium of claim 15, wherein the digital image of the object and the textual information about the object are received in a select query, and the data record associated with the component part comprises location information indicating a location of the component part, and
wherein the computer-readable storage medium has further computer-readable program code stored therein that, in response to execution by the processing circuitry, causes the apparatus to further at least, in response to receiving the select query, retrieve the location information indicating the location of the component part from the data record.

18. The computer-readable storage medium of claim 17, wherein the select query is received from a mobile device, and the computer-readable storage medium has further computer-readable program code stored therein that, in response to execution by the processing circuitry, causes the apparatus to further at least cause display of the information indicating the location of the component part via a graphical user interface (GUI) of the mobile device.

19. The computer-readable storage medium of claim 15, wherein the computer-readable storage medium has further computer-readable program code stored therein that, in response to execution by the processing circuitry, causes the apparatus to further at least access the source images of component parts and the source textual information about the component parts,
wherein the apparatus being caused to access comprises the apparatus being caused to access the source images that have been rendered from digital models of the component parts.

20. The computer-readable storage medium of claim 15, wherein the digital image of the object and the textual information about the object are received from a mobile device equipped with a digital camera that captured the digital image, and an input device that received user input of the textual information about the object.

21. The computer-readable storage medium of claim 20, wherein the mobile device is further configured to determine a location of the mobile device, and thereby a location of the object when the mobile device is determined to be located within a defined distance from the object, and
wherein the digital image of the object and the textual information about the object are received in an update query that also comprises location information indicating the location of the object.

\* \* \* \* \*